March 10, 1959 R. O. ISOLA ET AL 2,877,050
GLARE SHIELD CONSTRUCTION
Filed Sept. 28, 1956 2 Sheets-Sheet 1
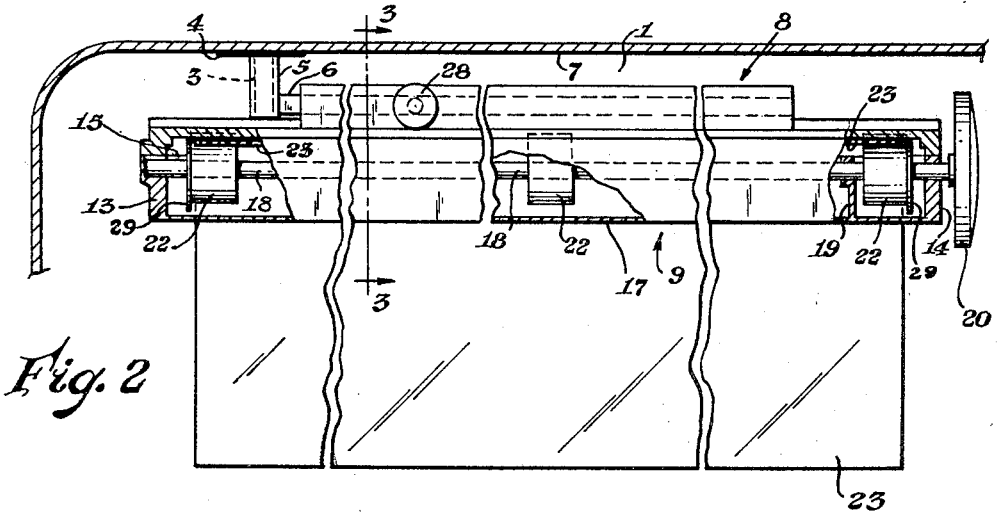
Fig. 2
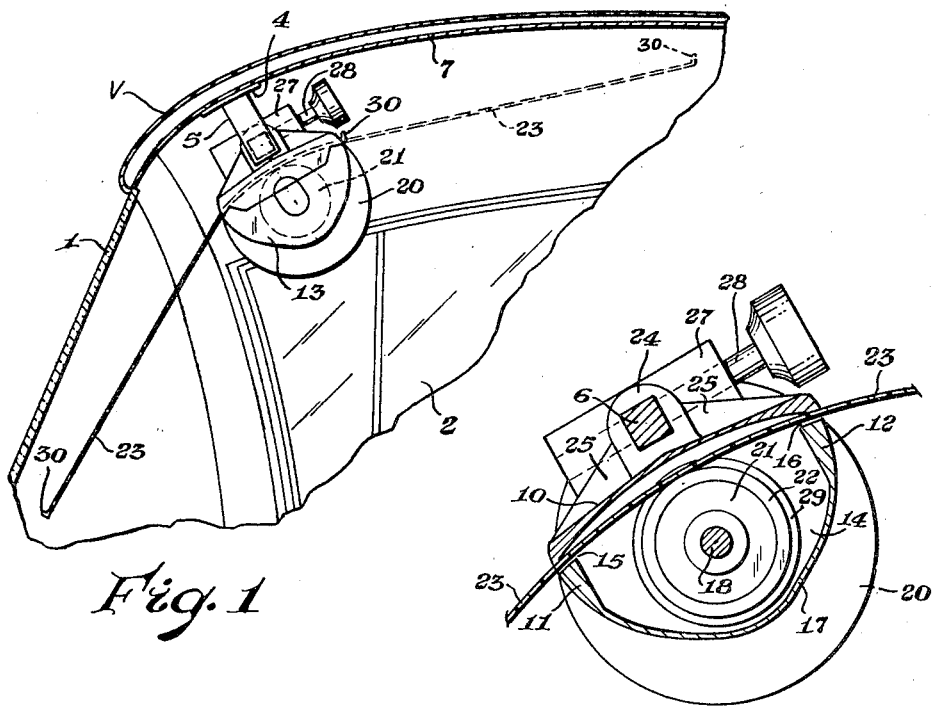
Fig. 1
Fig. 3
INVENTORS.
Raymond O. Isola
Norman R. Isola
Charles R. Isola
BY Fearman & Fearman
ATTORNEYS

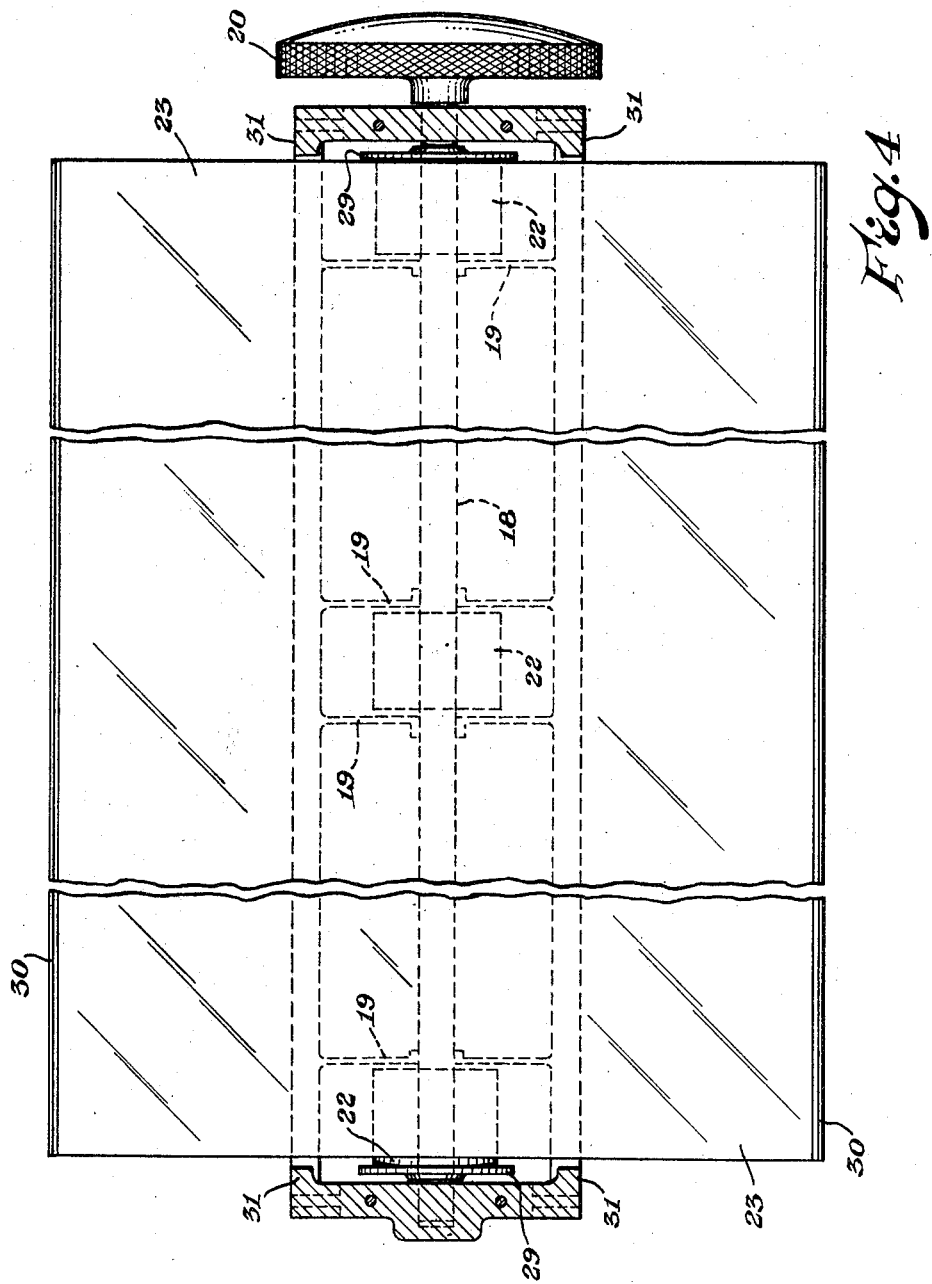

2,877,050
GLARE SHIELD CONSTRUCTION

Raymond O. Isola, Broad Brook, Conn., and Norman R. Isola and Charles R. Isola, East Tawas, Mich.

Application September 28, 1956, Serial No. 612,841

3 Claims. (Cl. 296—97)

This invention relates to glare shields for use in automotive vehicles and more particularly to an improved glare shield of the kind utilizing a transparent, glare absorbing sheet of suitable material and which may be substituted for the opaque visors with which most automotive vehicles are equipped.

Glare shields per se are well known in the art, most of them being of the kind which are intended for use auxiliary to the conventional sun visor with which most vehicles are supplied by the manufacturer. Other glare shields are intended to replace the conventional sun visors and require special mounting means, thereby rendering the mounting means for the sun visors useless. With the instant invention, however, it is proposed to replace the conventional opaque sun visor with a glare shield comprising a sheet of transparent, glare absorbing material and utilize the mounting means for the sun visor to mount the improved glare shield. One of the objects of the invention, therefore, is to provide a glare shield of such construction as to carry this proposal into effect.

Another object of the invention is to provide a glare shield composed of a minimum number of parts so as to keep the cost of the shield low.

A further object of the invention is to provide a glare shield construction in which the glare absorbing member is quickly and surely movable from its non-glare absorbing position to any one of a number of operative positions.

A further object of the invention is to provide a glare shield of the kind referred to which is readily adapted to be mounted at either the left- or right-hand side of the vehicle and which may be so mounted for operation as to accommodate either a right- or left-handed person.

Other objects and advantages of the invention will be pointed out specifically or will become apparent from the following description when it is considered in conjunction with the appended claims and the accompanying drawings, in which:

Fig. 1 is a fragmentary side elevational view of an automotive vehicle having a glare shield constructed in accordance with the invention in one of its operative positions;

Fig. 2 is a view, partly in front elevation and partly in cross-section, of the glare shield in the position it occupies in Fig. 1 and looking from the driver's seat towards the front of the vehicle;

Fig. 3 is a cross-sectional view taken on the line 3—3 of Fig. 2; and

Fig. 4 is a view partly in top plan and partly in section.

In Figs. 1 and 2 there is disclosed a portion of an automotive vehicle V having a number of windows, two of which are indicated at 1 and 2, through which light may pass. During daylight hours sunlight frequently may produce glare through the windows 1 or 2 and to provide the driver with some means of combatting such glare, conventional vehicles customarily include a post 3 mounted on a plate 4 secured to the roof of the vehicle adjacent to each of the upper corners of the windshield 1, and on each of which is mounted by suitable means (not shown) a pivotal sleeve 5 to which is secured a rod 6. On the rod 6 is usually mounted an opaque sun visor (not shown) which is swingable about the axis of the rod from a position substantially parallel to the ceiling 7 of the vehicle to a position substantially parallel to the windshield 1 to shield the eyes of the vehicle occupants from sunlight entering through the windshield. To shield the occupants' eyes from sunlight entering through the windows 2, the visors are swingable about the axis of the pivot post 3 to positions substantially parallel to the windows 2. While such visors effectively shield persons from sunlight, they obstruct vision and hence are hazardous to use. Because they do obstruct vision, conventional visors are not used at night and thus are not useful in eliminating glare from the headlights of on-coming vehicles. Apparatus constructed in accordance with the invention is effective not only in shielding one's eyes from sunlight, but also may be used to shield one from headlight glare and has the further advantage that vision is not impaired.

A glare shield formed according to the invention is indicated generally by the numeral 8 and comprises an elongate, tubular housing member 9 having a top wall 10, front and rear walls 11 and 12, respectively, and side walls 13 and 14. The front and rear walls are slotted as at 15, 16 for a major part of their lengths and converge below the slots along arcuate paths to form a bottom wall 17 for the member 9.

Mounted for rotation in suitable bearings in the end walls 13 and 14 of the member 9 is a shaft 18, and intermediate bearing ribs to stiffen the member 9 such as is indicated at 19 in Fig. 2, may be provided if desired. In the disclosed embodiment of the invention one end wall, 14, is apertured to permit passage of the rod 18 therethrough, but either wall, or both, may be apertured if desired so as to permit the shaft to project from either, or both, ends of the housing 9. On the end of the shaft which projects through the end wall 14 is fixed a wheel or knob 20 for a purpose later to be explained.

As is best shown in Fig. 2, a plurality of propelling rollers 21 is mounted at spaced intervals along the shaft 18, and each roller is keyed or otherwise made fast with the shaft. Each roller 21 includes a peripheral covering 22 of soft, high-friction rubber or like material for a purpose presently to be described. The arrangement of the parts described thus far is such that the covered rollers 21 project a short distance above the height of each of the slots 15 and 16 in the side walls of the housing member, or, stated differently, a plane tangent to the rollers 21 may pass through the side walls 11 and 12 at points spaced above the slots in the walls.

Through the slots 15 and 16 extends a sheet 23 of transparent plastic material such as vinyl, styrene, acetate or the like, which is rigid, but bendable along the arc of a circle. Suitable material of the kind referred to is available commercially under such trademarks as "Plexiglas," "Lucite," "Vinylite," and others. Such material conveniently may be tinted green, blue, or amber, so as to produce a shield having a high degree of glare absorbency.

When the sheet 23 is so installed in the housing member 9 that both of its ends extend outwardly through the side wall slots, the relative positions of the rollers 21 and the slots 15, 16, will force the portion of the sheet 23 which is within the housing 9 to bend or curve along the arc of a circle, as is best shown in Fig. 3. The material from which the sheet 23 is made will have a natural tendency to return to its planar condition and this tendency of the material will cause the sheet 23 to press very firmly against the rollers 21.

Means for mounting the housing member 9 and its contained shield 23 in position to protect one's eyes from glare is provided and comprises a tubular part 24 fixed to the top wall 10 of the member 9 and reinforced by suitable means such as wings 25. The part 24 is provided with a bore to match the cross-section of the visor rod 6 with which the vehicle originally is equipped, and with a socket member 27 having a tapped hole extending therethrough and in which is received a set screw 28 adapted to secure the housing member 9 in adjusted position on the rod 6 for either right or left-hand use.

In operation, the housing member 9 is secured to the rod 6 in place of the sun visor with which the vehicle originally was equipped, with the glare absorbing sheet 23 in the position shown by broken lines in Fig. 1. In the drawings, the glare shield 8 is shown installed for the convenience of a right-handed person, but it also may be installed for the convenience of a left-handed person merely by turning the housing member end-for-end so as to locate the knob 20 at the left-hand side. The set screw 28 also should be turned end-for-end. When the need for glare reduction arises, the occupant of the vehicle may turn the shaft 18 by its operating wheel 20 so as to cause rotation of the propelling rollers 21 counterclockwise as viewed in Figs. 1 and 3. Rotation of the rollers in this direction will propel the sheet through the housing 9 due to the firm, frictional engagement between the sheet 23 and the rubber or the like covered rollers 21.

As is best shown in Fig. 1, the position of the housing 9 is such that during propulsion of the sheet to its glare absorbing position, the latter moves through an angle such that in its operative position it is substantially parallel to the window 1. On retraction, the sheet moves through the same angle so as to lie substantially parallel to the ceiling 7 of the vehicle, as is shown by the broken lines.

The sheet 23 is guided in its movements through the housing 9 by flanges 29 which are fixed to the outer edges of the outer rollers 21, and by guide parts 31 which project inwardly from opposite ends of the slots 15 and 16 an extent sufficient to locate their inner surfaces in substantial alignment with the inner surfaces of the guide flanges 29. The sheet is prevented from passing completely through the housing by lips or flanges 30 formed at each end of the sheet and adapted to engage the housing when the sheet has been moved to either of its fully retracted or fully extended positions. It is not necessary that the sheet be extended its full length; it need be extended only a distance sufficient to shield effectively the eyes of the occupant. Thus, the glare shield has a large number of operative positions.

In the event it is desired to shield the occupant of the vehicle from sunlight or other glare entering the window 2, the sheet 23 may be extended to the position shown in full lines in Fig. 1 and the assembly pivoted about the axis of the post 5 to position the shield between the occupant and the window 2.

The disclosed embodiment is representative of a preferred form of the invention, but the disclosure is intended as illustrative rather than definitive of the invention. The invention is defined in the claims.

We claim:

1. A glare shield construction for mounting adjacent the ceiling and front windshield of a motor vehicle comprising, a longitudinally extending housing member having longitudinally extending front and rear walls; said front and rear walls having longitudinally extending opposed linear slots in the respective upper portions thereof; a sheet of stiff resilient glare absorbing longitudinally extending material extending through the slots in said walls so that a portion of said sheet is within said housing, said sheet having a normal tendency to assume a planar configuration but being bendable along an arc of a circle; a longitudinally extending shaft; means mounting said shaft for rotation in said housing below said slots; sheet propelling rolls coextensive with said sheet mounted on said shaft for rotation therewith and having a high-friction covering in surface engagement with said sheet, the diameter of said rolls being such that the outer periphery thereof extends outwardly beyond a plane connecting the slots in the front and rear wall to cooperate with the upper marginal edges of said slots and bend the sheet along an arc of a circle, thereby assuring firm frictional engagement between said sheet and said sheet propelling means; and means on said shaft for rotating the latter and said sheet propelling means for selectively propelling said sheet through said housing in first one direction and then in the opposite direction.

2. The construction as set forth in claim 1 including means at opposite ends of said sheet for engagement with said housing to limit the passage of said sheet through said housing.

3. The construction as set forth in claim 1 in which said sheet propelling rolls include means for guiding said sheet in its movements through said housing.

References Cited in the file of this patent

UNITED STATES PATENTS

| | | |
|---|---|---|
| 1,917,799 | King et al. | July 11, 1933 |
| 2,235,421 | Devine | Mar. 18, 1941 |
| 2,358,173 | McFadyen | Sept. 12, 1944 |
| 2,526,889 | McComb | Oct. 24, 1950 |